(12) United States Patent
Nguyen et al.

(10) Patent No.: US 12,726,883 B2
(45) Date of Patent: Sep. 1, 2026

(54) FIRST RESPONDER NETWORK IMPROVEMENTS FOR HIGH-CAPACITY ENVIRONMENT

(71) Applicants: AT&T Intellectual Property I, L.P., Atlanta, GA (US); AT&T Mobility II LLC, Atlanta, GA (US)

(72) Inventors: Cecilia Nguyen, Hickory Creek, TX (US); Slawomir Mikolaj Stawiarski, Carpentersville, IL (US); Rajesh Panta, Bridgewater, NJ (US); Ioannis Broustis, Basking Ridge, NJ (US); Joseph Maniaci, St. Paul, MN (US); Daniel Ulanday, Pleasanton, CA (US); Prasanna Thulasiram, Bothell, WA (US); Naresh Poka, Alpharetta, GA (US); Giritharan Rana, Basking Ridge, NJ (US); Shomik Pathak, Richardson, TX (US); Vladimir Gusavac, Dunwoody, GA (US); Richard Caine, Elgin, IL (US); Rory Darwin Pinili, Elgin, IL (US); Jing Xu, Danville, CA (US)

(73) Assignees: AT&T Intellectual Property I, L.P., Atlanta, GA (US); AT&T Mobility II LLC, Atlanta, GA (US)

( * ) Notice: Subject to any disclaimer, the term of this patent is extended or adjusted under 35 U.S.C. 154(b) by 329 days.

(21) Appl. No.: 18/490,912

(22) Filed: Oct. 20, 2023

(65) Prior Publication Data

US 2025/0133479 A1 Apr. 24, 2025

(51) Int. Cl.
*H04W 48/06* (2009.01)
*H04W 4/90* (2018.01)

(52) U.S. Cl.
CPC ............ *H04W 48/06* (2013.01); *H04W 4/90* (2018.02)

(58) Field of Classification Search
CPC . H04L 41/0631; H04L 41/147; H04L 47/823; H04W 16/22; G06F 11/3447; G06F 11/3452
USPC ...................................................... 455/404.1
See application file for complete search history.

(56) References Cited

U.S. PATENT DOCUMENTS

2013/0301609 A1* 11/2013 Smith .................. H04W 16/14 370/329
2020/0196198 A1* 6/2020 Hoffner ............ H04W 28/0268
2023/0008570 A1* 1/2023 Beyer .................... H04W 4/90
(Continued)

*Primary Examiner* — Maria El-Zoobi
(74) *Attorney, Agent, or Firm* — Guntin & Gust, PLC; Erik Boyd

(57) ABSTRACT

Aspects of the subject disclosure may include, for example, receiving information defining a high-capacity event in a mobility network, receiving information defining a network location of the high-capacity event in the mobility network, automatically configuring one or more network components of the mobility network according to a set of high-capacity parameters, the one or more network components associated with the network location of the high-capacity event, limiting access to the mobile network to specific users according to the high-capacity parameters, and after the high-capacity event, automatically configuring the one or more network components of the mobile network according to a set of reversion parameters. Other embodiments are disclosed.

20 Claims, 10 Drawing Sheets

(56) References Cited

U.S. PATENT DOCUMENTS

2023/0209320 A1* 6/2023 Tabak .................. H04L 67/306
455/404.2

* cited by examiner

224

242

252

CLOUD COMPUTING ENVIRONMENTS 375
VIRTUALIZED NETWORK FUNCTION CLOUD 325
VNE 330
VNE 332
VNE 334
TRANSPORT LAYER 350
BROADBAND ACCESS 110
VOICE ACCESS 130
WIRELESS ACCESS 120
MEDIA ACCESS 140
CONTENT SOURCES 175
300

600

FIRST RESPONDER NETWORK IMPROVEMENTS FOR HIGH-CAPACITY ENVIRONMENT

FIELD OF THE DISCLOSURE

The subject disclosure relates to improvements in first responder communication networks to improve service delivery during periods of high demand.

BACKGROUND

Telecommunications networks include first responder facilities which deploy, operate, maintain and improve high-speed wireless communication networks for first responders such as police, fire and other emergency personnel. Particularly during emergency situations, such networks can approach or exceed capacity limitations. The networks should be flexibly adaptable to increased capacity requirements.

BRIEF DESCRIPTION OF THE DRAWINGS

Reference will now be made to the accompanying drawings, which are not necessarily drawn to scale, and wherein.

DETAILED DESCRIPTION

Figure 1:
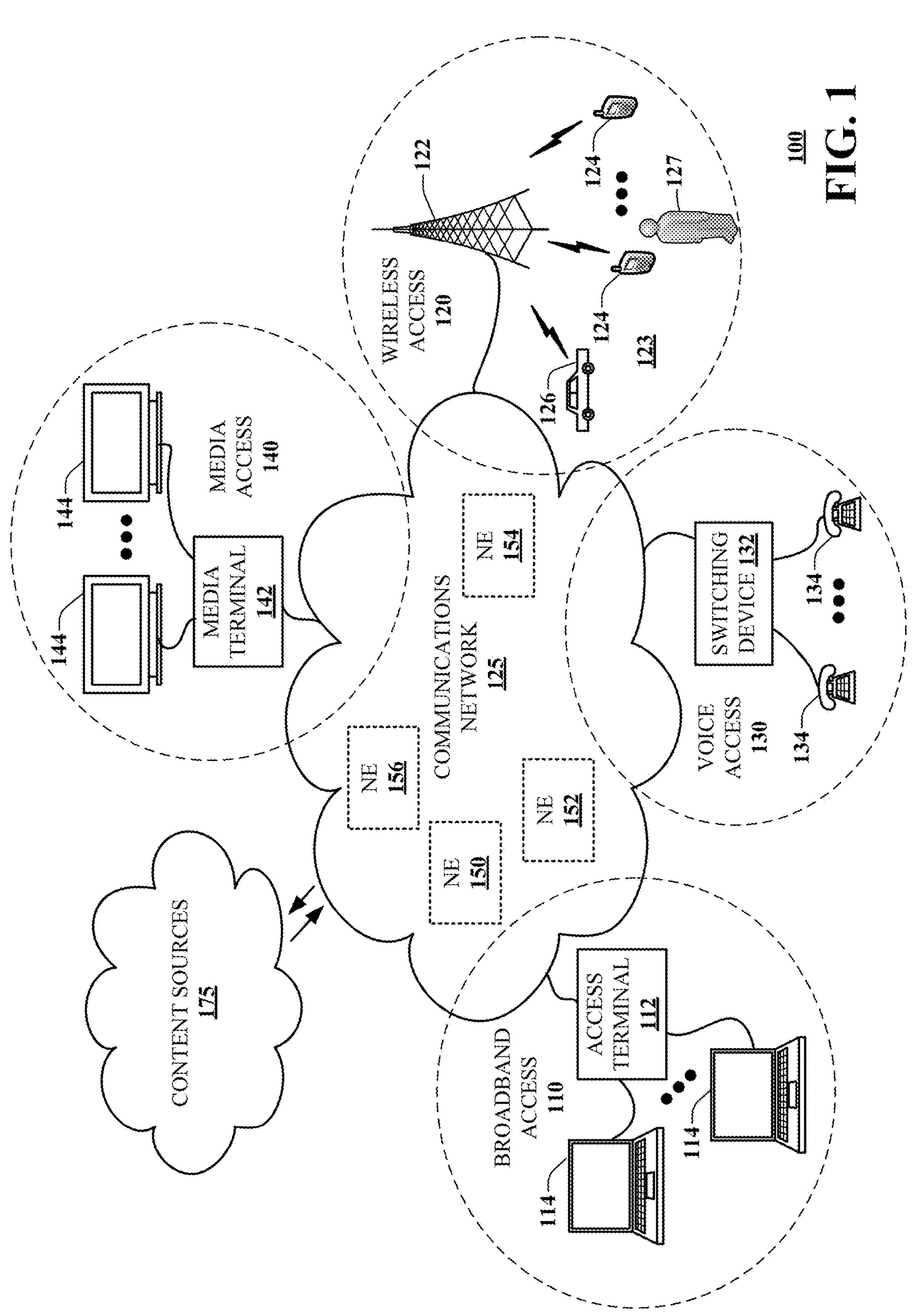
FIG. 1 is a block diagram illustrating an exemplary, non-limiting embodiment of a communications network in accordance with various aspects described herein.

The subject disclosure describes, among other things, illustrative embodiments for automatically configuring network components in a mobility network that overlaps with or includes a first responder network. Dedicated facilities of the first responder network may be shared between first responder users and commercial users of the mobility network. When a high-capacity event occurs that may affect first responder users, the location of the event is determined and parameters are automatically conveyed to the facilities of the first responder network to configure the facilities to first responder use only. In embodiments, the event may be detected automatically and an artificial intelligence and machine learning process may monitor network performance and tune parameters to optimize network performance. Other embodiments are described in the subject disclosure.

One or more aspects of the subject disclosure include receiving information defining a high-capacity event in a mobility network, the mobility network including network elements selectively configurable to a first responder configuration for providing communication services to first responder users, receiving information defining a network location of the high-capacity event in the mobility network, and configuring a set of first responder elements of the network elements to the first responder configuration, wherein the set of first responder elements are automatically selected based on the information defining the network location of the high-capacity event, wherein the configuring the set of first responder elements prioritizes access to the set of first responder elements by first responder users. Aspects of the subject disclosure further include enabling access to the set of first responder elements by the first responder users based on the configuring the set of first responder elements and limiting access to the set of first responder elements by non-first responder users based on the configuring the set of first responder elements.

One or more aspects of the subject disclosure include receiving information defining a high-capacity event in a mobility network, the mobility network including network elements selectively configurable to a first responder configuration for providing communication services to first responder users during high-capacity events, receiving information defining a network location of the high-capacity event in the mobility network, and receiving information defining a set of first responder elements of the network elements, the set of first responder elements including network elements requiring configuration to a first responder configuration to respond to the high-capacity event. Aspects of the subject invention further include configuring a set of first responder elements of the network elements to the first responder configuration, wherein the configuring the set of first responder elements comprises providing to the set of first responder elements first responder parameters which relate to admission control and load balancing in the set of first responder elements; and confirming that the set of first responder elements of the network elements has been configured to the first responder configuration.

One or more aspects of the subject disclosure include receiving information defining a high-capacity event in a mobility network, receiving information defining a network location of the high-capacity event in the mobility network, automatically configuring one or more network components of the mobility network according to a set of high-capacity parameters, the one or more network components associated with the network location of the high-capacity event, limiting access to the mobile network to specific users according to the high-capacity parameters, and after the high-capacity event, automatically configuring the one or more network components of the mobile network according to a set of reversion parameters.

Referring now to FIG. 1, a block diagram is shown illustrating an example, non-limiting embodiment of a system 100 in accordance with various aspects described herein. For example, system 100 can facilitate in whole or in part identifying a high-capacity event in a network and automatically updating parameters of dedicated first responder components of the network to limit access to the first responder components by non-first responder users. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or another communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

In some embodiments, one or more portions of the communications network 125 can include a first responder network 123. For example, the wireless access 120 may be embodied as first responder network 123 including all or a portion of a mobility network providing particular communication services to a select plurality of mobile devices such as mobile devices 124, vehicles such as vehicle 126 and personnel 127. Communication services may be provided via a plurality of base stations or access points such as base station 122. The first responder network 123 may serve a particular geographic area of any size including up to nationwide. The first responder network 123 includes facilities dedicated to use by first responders such as police, fire, and other emergency personnel. The first responder network 123 may overlap or share facilities with a commercial wireless network, also provided by the wireless access 120. Other users may make use of the facilities of the first responder network 123, generally including anyone needing reliable and rapid access to communication facilities. When the facilities of the first responder network are not dedicated to emergency or other purposes, some or all of the facilities may be repurposed or shared with the commercial communication network. One embodiment of a first responder network is the FirstNet network operated by the First Responder Network Authority, an independent authority within the U.S. Department of Commerce. In some embodiments, the first responder network 123 may be a fourth generation (4G), fifth generation (5G) or higher generation cellular network as defined by the $3^{rd}$ Generation Partnership Project (3GPP).

The first responder network 123 may include infrastructure that is adjacent to and independent of other wireless communication networks, including commercial communication networks. such as wireless access 120. For example, a mobility network included in the wireless access 120 may include a core network which includes various functional blocks such as a mobility management entity, a billing and authorization entity and a physical gateway for access to the public internet. For maximum availability and reliability, the first responder network 123 may have similar functional entities which are independent of the comparable entities of the commercial network. For example, the first responder network 123 may operate with its own core network that is independent of the core network of any commercial network.

In some embodiments, the first responder network 123 may share network components or facilities with a commercial network. When required for first responder purposes, the shared network components may be configured for operation within and as part of first responder network 123. In one example, a portion of electromagnetic spectrum designated Band 14 is licensed for the specific purpose of creating a nationwide public safety wireless broadband network. Band 14 generally includes 20 MHz of spectrum in the 700 MHz frequency band and is reserved for emergency communications. In some cases, private network operators can use Band 14 for commercial communications. However, in event of an emergency, first responders must be given priority and preemption over non-first responder users. If necessary, all commercial traffic must be dropped and the network including Band 14 must be dedicated to first responders. Thus, a normal or commercial cellular phone may no longer work during an emergency, but a first responder-enabled device will continue to operate on components of the first responder network. In the event of an emergency, the commercial users may be moved to facilities of the commercial network.

In embodiments, the components of the first responder network 123 must be configured with specific parameters, which may be referred to as first responder configuration parameters. Such network components may include base stations including an eNodeB device for 4G networks and a gNodeB device for 5G networks, routers, switches, and core network components. The first responder configuration parameters control and limit operation of the network components to prioritize first responder communications.

Such network configuration may be done according to an event. An event may be defined by time and space, or by a time duration and an affected geographic area. An event may be any situation where the network operator expects a large number of subscribers and first responders. Such a large number of subscribers active on the network, whether planned or unplanned, may create capacity issues for components of the first responder network. An event may be any situation where the first responder network 123 must be available for exclusive use by first responders and other authorized personnel for authorized purposes. Such events may include planned events and emerging events, such as a concert or sporting event attended by a large number of people at a particular location at a designated time. An emerging event may be an unplanned event but one that is detected by network operators. Examples include a weather emergency such as an approaching hurricane or wildfire, which is detectable and relatively predictable several days in advance. Such events may also include unplanned events such as a sudden weather emergency or other natural disaster, or a criminal occurrence. Any event where the first responder network must be configured for use exclusively by first responders may be referred to as a configuration event.

The first responder network 123 and its components requires a specific network configuration for such configuration events. Currently, for a planned configuration event or an emerging configuration event, the network operator will implement a selected network configuration manually. The network operator must first determine an affected area of the event and identify network components, such as cell sites, which must be configured for the event. One or more engineers or other network personnel will specify device configuration parameters for selected network components that will be affected by the planned event or by an emerging event. Network personnel, such as an engineer or other user can specify a script. The script may include a list of commands which make required changes to components of the network. The list of commands are provided to a network management portal where the actual changes are made, and configuration data is provided to the components of the network. The process is generally not scheduled and requires the end user to manually implement and execute the required changes.

Thus, for example, if a concert is scheduled at a site in a region, network personnel must be made aware of the concert. Network personnel must then identify network sites such as base stations or eNodeB devices which are required to be changed to a first responder configuration for the concert. The network personnel then must manually create a script including entering parameters for the identified sites in the network before the event starts and push the parameters to network components. Following the concert, the end user must determine an appropriate time to reconfigure the network to revert parameters from the first responder configuration to the normal configuration. Network personnel may create additional scripts which revert the parameters as required and enter the changes in the network management portal to be sent to the network components for updating and reversion to normal configuration.

A variety of network and device parameters may be updated or changed between the first responder configuration and the normal configuration. An example is parameters related to admission control which define, when a cell site experiences heavy traffic or is overloaded, which users can be admitted to a cell and which users are denied admission to a cell. Another example is parameters related to load balancing, such as defining how, in a cell dedicated to first responder communications that becomes overloaded with traffic, non-first responder UE devices are moved away from the cell to free up capacity in the cell for first responder traffic. Another example relates to reducing load on a first responder cell. For example, carrier aggregation may be used to increase throughput to a customer. If a first responder cell becomes overloaded, the carrier aggregation feature may be disabled for commercial users to improve capacity for the first responder users. This gives the first responder users a higher priority.

The engineer or other network personnel can specify the event parameters some time before the event, such as days or weeks in advance of a known planned event. For example, a sporting event at a particular facility will be known to affect a selected set of base stations, switches, routers and other equipment. Or the engineer can specify the event parameters for application "as soon as possible." In an example, a criminal event in a particular area may be an emerging event that requires configuration of selected network equipment away from commercial use to first responder use. Since such events may occur regularly, the network operator may have a prerecorded or preexisting script which specifies all parameters for all devices that must be configured for an event before the event occurs.

However, configuring the network components for the first provider network 123 can take substantial time and effort to prepare for a large number of events or for widespread events. For each event, the network personnel must manually perform the steps required to configure the first user network configuration parameters. In some cases, the network operator may choose or simply have to implement the event parameters sooner than desired for the event or keep the event parameters in place long after the event. Thus, the event parameters may be implemented even during times when they do not need to be implemented. However, the event parameters are generally crafted for a specific type of event. If the event parameters are in place outside of the time required for the event, network operation may be degraded or operate in an undesired manner. For example, capacity for commercial traffic may be reduced because a set of base stations is configured with first responder parameters for an event outside the time planned for the event.

Moreover, in many cases, user experience on a first responder network has not been good even after appropriate settings and parameters have been applied. In some cases, reserving Band 14 or other spectrum for first responder users has not been adequate due to volume of first responder users using the Band 14 capacity. In some cases, the experience of commercial user equipment (UE) users has been affected due to sheer volume of load from combined first responder and commercial users in the network. In other cases, a lack of backhaul capacity has caused degraded UE experience despite application of first responder settings. Backhaul is communication of network data from a cell site or base station to the core network of the communications network.

Accordingly, it becomes desirable to automate the deployment of network parameters for an event, only during the event, and to automatically return the network parameters to a nominal state promptly after the event. The end users may be able to schedule deployment of network parameters just for the event time frame. For example, network personnel can specify a start time and an end time when the automation solution may put in place the event parameters and remove the event parameters, as well as specify particular parameter values for specific events. The automation solution further retrieves the parameters which are required for a given event and implements those parameters automatically to the network. The engineers and network personnel may not need to enable the event parameters through any scripting or manual process.

In the event of an unplanned event, there may be inadequate time to reliably apply event parameters. First, the actual occurrence of the unplanned event is, by definition, unknown. Second, the scope of the unplanned event is initially unknown. For example, in the case of an unplanned event in the form of sudden storm, the location of affected cell sites is not known and will change over time as the storm moves through an area. Second timing is unknown as the storm may stall in a particular location, despite forecast information. An automation solution may simplify and speed up the process of providing event parameters for an unplanned event with dynamically changing time and geographic limitations.

Figure 2A:
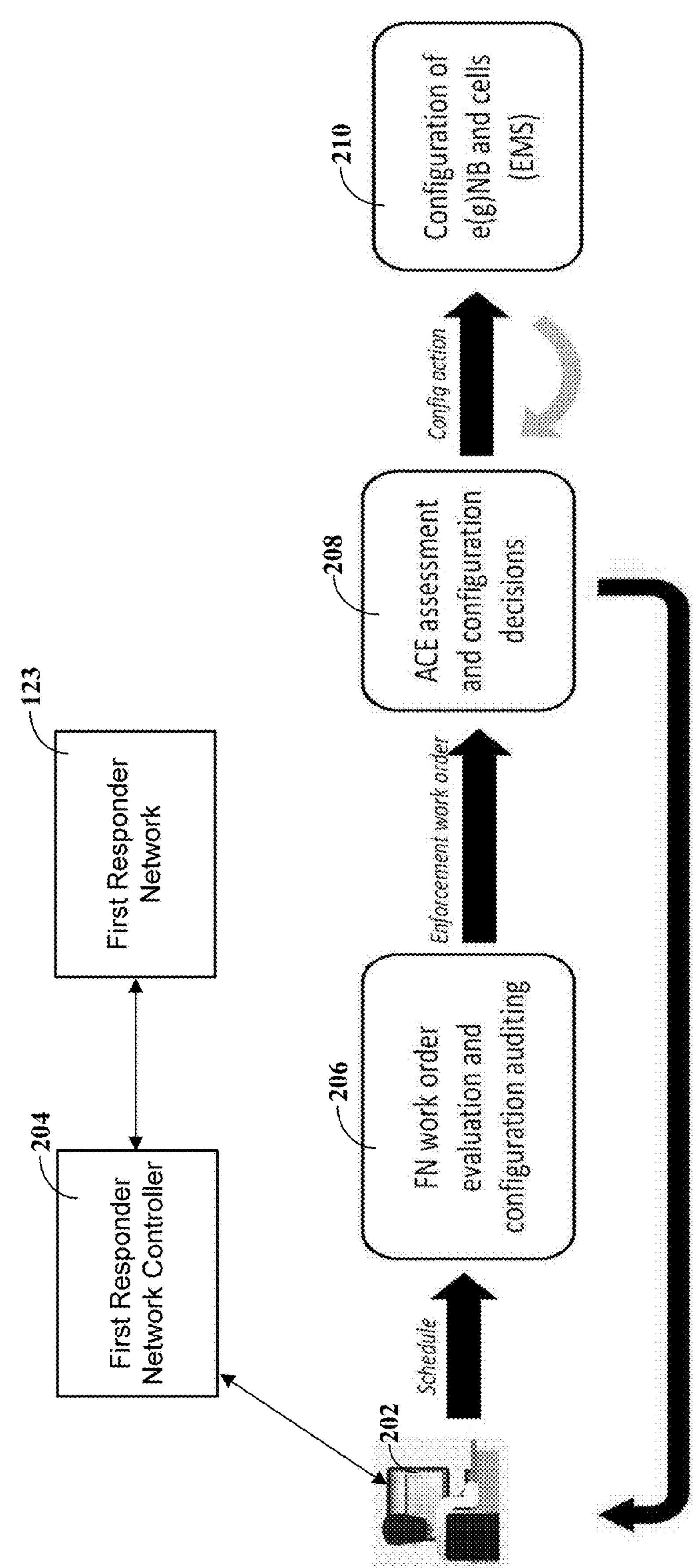
FIG. 2A is a block diagram illustrating an example, non-limiting embodiment of a method functioning within the communication network of FIG. 1 in accordance with various aspects described herein.

FIG. 2A is a block diagram illustrating an example, non-limiting embodiment of a method 200 that may be implemented within the communications network 125 of FIG. 1 in accordance with various aspects described herein. The method 200 may be used to automatically control establishment of a first responder configuration for all or a portion of communications network 125 such as first responder network 123. FIG. 2A illustrates first responder network configuration for planned events and unplanned events involving the communications network 125. A planned event is any event which is known in advance, including a few days or weeks in advance or even a few minutes in advance.

The method 200 may be implemented, for example, using a control device 202 and a first responder network controller 204. The method 200 is initiated by a user operating the control device 202. The user has access to information about timing of the planned event and location of the planned event. As noted, timing may be immediate or remote in time. Location of the event may be a particular facility such as a concert venue or other site requiring first responder communications. The user may have access to this information from any suitable source and the event may be one occurrence of a scheduled series of events.

The control device in this example is in data communication with the first responder network controller 204. The first responder network controller 204 is further in data communication with components of the first responder network 123 for collecting information about the components of the first responder network and for controlling the components of the first responder network 123. In particular, the first responder network controller 204 may provide data defining operational parameters to the components of the first responder network 123 to modify and control the operational configuration of the components of the first responder network 123.

In an example, the user accesses a local application of the control device 202 which is in communication with a server application of the first responder network controller 204. The local application and the server application together form a portal for user access and control of aspects of the first responder network 123. The first responder network controller 204 may be located at any suitable location of the communications network 125 including, for example, a core network of the first responder network 123 or of a mobility network including the first responder network. The first responder network controller 204 implements an automation routine to control the first responder network 123 according to inputs received at the first responder network controller 204 from the user at the control device 202. The first responder network controller 204 operates to, among other functions, modify parameters of components of the first responder network 123 in anticipation of a planned event, to enable a first responder configuration for the duration of the event. Following the event, the first responder network controller 204 operates to modify the parameters of the components of the first responder network 123 to revert to an original configuration or normal configuration of the first responder network 123. Components of the first responder network 123 may be shared with a commercial mobility network, including during some of all of the time period associated with the planned event.

The user accesses the control device 202 and provides information about timing and location of the event. The control device 202 may be any suitable data entry device such as a laptop computer, workstation, tablet computer or even a handheld device such as a mobile telephone or UE device active on the communications network 125. In one example, the control device 202 includes a graphical user interface configured to display a map and other graphical features along with text. The user may interact with the control device 202 to input data using a keyboard, touch screen interface, mouse or any other suitable device.

Figure 2B:
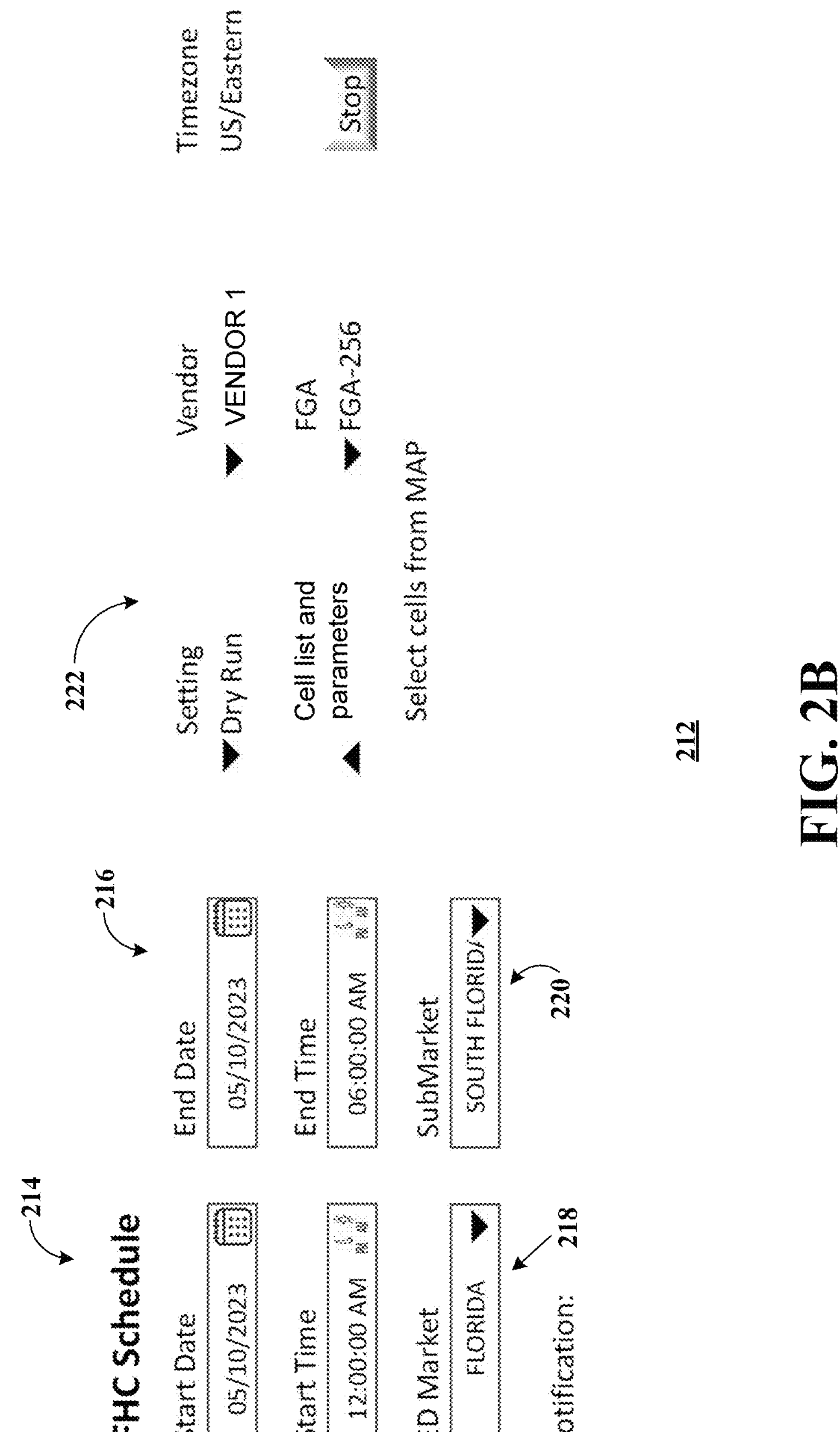
FIG. 2B is a block diagram illustrating an example, non-limiting embodiment of user display for an operator performing a method in accordance with various aspects described herein.

In an example, the control device 202 displays, on the graphical user interface, a menu for data entry and a map of a region served by the first provider network 123. FIG. 2B illustrates an example, non-limiting embodiment of user display 212 for an operator performing a method in accordance with various aspects described herein. In particular, the user display 212 may be displayed on a control device 202 of a user (FIG. 2A) when establishing a schedule for configuring parameters of a communication network such as first responder network 123 (FIG. 1). The user display 212 provides a menu for specifying time and location information for cells of the first responder network 123 to be configured according to first responder parameters. In the example, the user display 212 includes a start selector 214, an end selector 216, a first location selector 218 and a second location selector 220, and a parameter specification field 222. In the example of FIG. 2B, the elements of the user display are presented as pop-up menu items that may be actuated and selected by a user such as the user of the control device 202. Any suitable interactive system may be used in addition or instead of the example shown.

The start selector 214 and the end selector 216 enable the user of the control device 202 to specify a beginning time and an ending time, respectively, when the first responder configuration should be applied to the components of the first responder network 123. In the example, a date and time of day may be specified for each of the starting time and the ending time. In alternative embodiment, a starting date may be specified along with a duration, such as 24 hours, four days or one week. If the event is periodic in nature such as a regularly scheduled meeting at a location, a repeat time may be specified in some examples.

The first location selector 218 and the second location selector 220 may be actuated by the user of the control device 202 to specify a portion of the first responder network 123 to be reconfigured according to the first configuration parameters. In the example, first location selector 218 may be used to select a market of a network operator and the second location selector 220 may be used to select a sub-market of the network operator, such as "Florida" and "South Florida" in the example. In some examples, the specified location information may be used to display a map of the region as exemplified in FIG. 2C.

The parameter specification field 222 includes a plurality of data entry fields to enable selection or specification of a user of a set of parameters for configuration in components of the first responder network 123. In the example, a setting may be specified, such as "dry run" or "test" or "production," corresponding to the operating condition for the network. For example, during a "dry run" condition, the parameters may be communicated to the components of the first responder network without actually be activated. During a "production" setting, the components are reconfigured according to the first responder configuration.

The parameter specification field 222 further includes a vendor identifier. The network operator may use equipment sold by multiple original equipment manufacturers for different functions in the first responder network 123. Each vendor's equipment may have unique parameters or parameter sets which differ from other vendor equipment. Accordingly, the vendor identifier allows the user of the control device 202 to specify a vendor identity for the configuration. Other fields may be specified in other examples, such as an equipment identifier or model number of the vendor.

The parameter specification field 222 in the example further includes a cell list and parameter selector for specifying components of the first responder network 123 to configure particular parameters for the components to modify in the configuration. This may be specified in any suitable form. In the example, a pop-up menu is used to select cells and parameters of interest. In one example, a location is associated with a set of cells or other components so that, when an event occurs there, the cells or components are automatically selected for reconfiguration. This may be done using a predefined template of information, for example. In one example, if Madison Square Garden in New York City is specified as the location of interest for the event, a predefined set of cells or components may be identified and selected. Further, a predefined set of parameters may be reconfigured at the predefined set of cells according to a standard template for an event at Madison Square Garden. The user accessing the control device 202 may modify the standard devices and parameters specified by the template to account for particular details of a particular event.

Figure 2C:
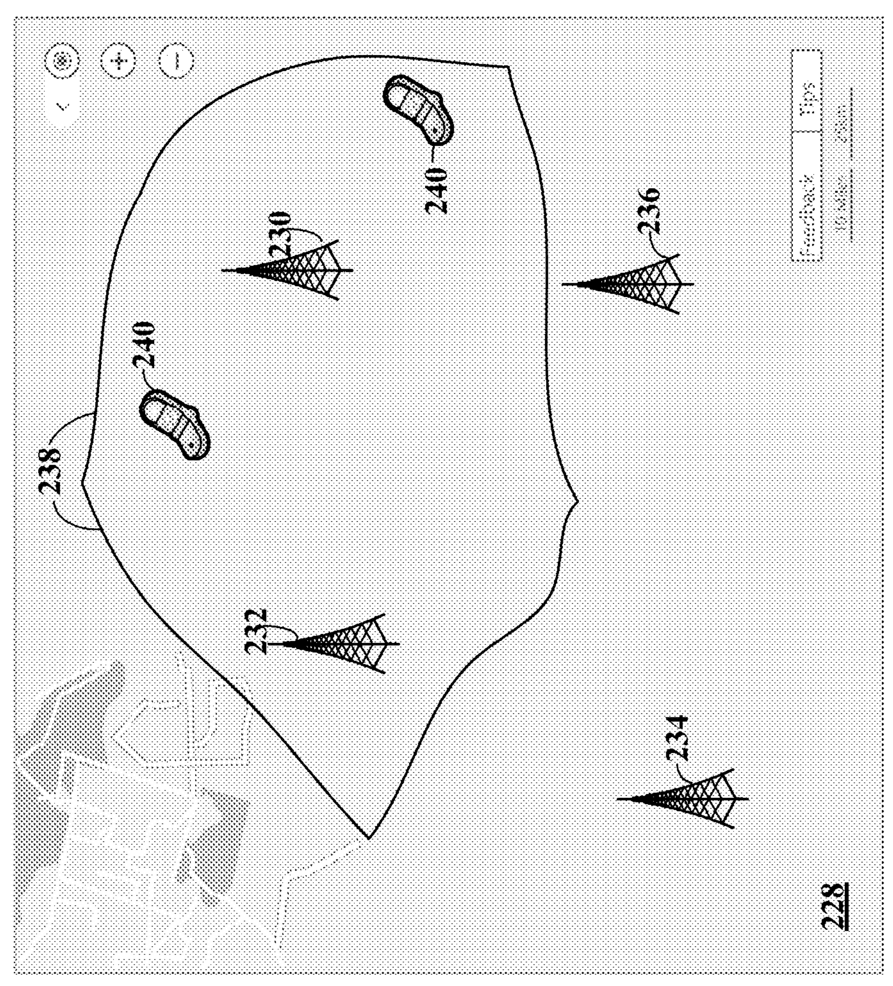
FIG. 2C is a diagram illustrating an example, non-limiting embodiment of user display for an operator performing a method in accordance with various aspects described herein.

In some examples, the cells or other network components may be selected by the user viewing a map of the location and using a device such as a mouse to select the cells of interest. FIG. 2C is a diagram illustrating a further exemplary, non-limiting embodiment of a user display 224 for an operator performing a method in accordance with various aspects described herein. The user display 224 includes a map view 228 of cell sites including a cell 230, a cell 232, a cell 234 and a cell 236 of a mobility network in a region of interest. The cell sites 230 may be configured according to configuration parameters provided to the cell sites. In particular, the cell sites may be individually configured according to a first configuration or a normal configuration and selectively configured according to a second configuration or a first responder configuration.

In an example, a user accessing a control console such as control device 202 (FIG. 1) may use a mouse or touchscreen to interact with the map 228 and draw a boundary 238 on the map 228. Cell sites such as cell 230 and cell 232 that are within the boundary 238 may be selected and form a group of cells to be configured. Cell sites outside the boundary 238, such as cell 234 and cell 236, may be unselected and therefore are not part of the group of cells to be configured.

In the example, the map 228 further shows individual UE devices 240. In some embodiments, the user display 224 may include viewing options that allow the user to select particular data and features to be displayed on the map 228, such as displaying streets in the region, displaying cell sites of a particular technology such as 4G and 5G cells or cells using a particular frequency band such as Band 14 at 700 MHz and other bands at 1900 MHZ.

In some examples, the map 228 may be color coded to assist the user in rapidly understanding the status of network components displayed on the user display 224. In particular, color coding may be used to indicate a particular configuration or set of configuration parameters applied to each respective cell.

Referring again to FIG. 2A, the user may access the control device 202 to specify a location or locations of a set of cell sites, a set or sets of parameters for the cells of the set of cell sites, and a schedule for automatically reconfiguring the parameters of the cell sites. The user may access a display device such as user display 212 (FIG. 2B) to specify the schedule, location and parameters to be configured.

The method 200 may be used to automatically control establishment of a first responder configuration or other configuration for all or a portion of a communication network such as first responder network 123 operated by a network operator. In a first embodiment, a user may initiate automation of reconfiguration of cell sites. This may be done for a planned or emerging event. In a second embodiment, the reconfiguration may be done automatically for an unplanned event detected by automatic processes. In a third embodiment, the reconfiguration may occur under control of an artificial intelligence process.

In the first embodiment, the user is aware of an event that is going to happen sometime in the future or will happen imminently. In accordance with this embodiment, the user can access a resource of the network operator such as a portal. The portal may be accessed, for example, using a device such as control device 202. The portal may provide a user interface such as user display 212 (FIG. 2B) and user display 224 (FIG. 2C). The user can specify a location and a time for the configuration of the cell sites. For example, the user may view a map such as map 228 and use a mouse or other device to draw a polygon such as polygon 238. The polygon corresponds to a set of cell sites, base stations or eNodeB devices or gNodeB devices (generally, "sites") that are likely to experience relatively high traffic volumes due to the event in the area. Accordingly, for those sites, first responder users will be prioritized in the network. The user can specify a time or schedule for the configuration of the sites, including a start time and an end time associated with the event. The start time and end time may be days or weeks in advance of the time of the event. Also, the user may specify that the configuration to the first user configuration occur "as soon as possible," (ASAP) meaning that the event is imminent and about to occur, and that specification of configuration parameters and values should be done immediately. The ASAP specification may include a stop time or reversion time, or a duration after the start time, when the configuration should be returned to a normal state after the imminent event.

Prioritization of first responder users may be done in any suitable fashion. In the example, parameters related to admission control and load balancing may be used to limit access to particular portions of the first responder network by commercial users, or users who do not have first responder status. Limiting access may include preventing a commercial user from attaching to a cell due to a current traffic level at the cell exceeding a threshold. The traffic level may be determined in any suitable manner, such as number of UE devices attached to the cell or current data throughput at the cell. Load balancing may be achieved in any suitable manner, such as handing off a commercial user's UE device from a dedicated first responder cell to a non-first responder or commercial cell. Further, carrier aggregation may be enabled or disabled to manage and limit the number of non-first responder users accessing cells of the first responder network 123 or to manage access to the first responder network 123 by the first responder users. While the embodiments discussed herein relate to first responders, any user or group of users may be prioritized in accordance with the embodiments described herein.

In response to the information about time and location provided by the user, a list is automatically generated of sites that need to be configured. Further, the parameters that need to be configured are determined, along with the required values for the parameters that need to be configured. These determinations are performed automatically by any suitable device such as the first responder network controller 204. For example, the first responder network controller 204 may include or access a database where configuration information is stored. In some embodiments, an automation process applies one or more templates to control configuration of the sites. The templates may be predetermined based on information about the radio access network including current loading and traffic levels, anticipated traffic levels, current status of network elements (such as a base station taken offline due to maintenance), and other factors. The templates may be stored in any suitable location such as a database stored at the first responder network controller 204.

In the example of FIG. 2A, the user provides schedule and location information, and, at step 206, a first responder work order is prepared and evaluated. The user may perform a dry run to review what changes will be performed by the automated process and a what sites, and to compare the automated changes with expected changes that would be made manually. The work order may specify the sites to be configured, the respective parameters at each site to be configured for the event, and the values of the respective parameters to be established for the event in order to place the sites in the first responder configuration. At step 208, the work order and other information are assessed, and final configuration details are specified. As indicated in the drawing figure, information may be fed back to the user to modify or update the configuration plan or schedule information. Such information may include notifications such as a change configuration report with a list of changes implemented or not implemented and indicating a success rate. Such notifications and other information allow the user to actively monitor the status of components in the first provider network during the event. Further, the configuration is scheduled according to the timing specified by the user. If the configuration is for a planned event to occur in the future, information about the configuration may be stored and accessed at the appropriate time. If the configuration is designated as "as soon as possible," the configuration will begin immediately.

In some embodiments, information about the original configuration or normal configuration is stored prior to configuring the components of the first provider network. The information may include information about the device parameters associated with the components of the first provider network prior to configuration for first provider use. The information may form a network state or device state that will be retrieved when normal operation resumes, following the event.

At step 210, the specified sites are configured according to the first responder configuration. This may be done remotely, by communicating configuration information from, for example, the first responder network controller 204 to individual components of the first responder network 123. Such components may include eNodeB devices and gNodeB devices which control the radio access network (RAN) for users. The specified parameters for the first responder configuration, along with parameter values, are communicated to respective sites and updated. Any other components of the network, such as switches or routers used for backhaul, for example, may be updated to the first responder configuration as well. The components remain in the first responder configuration for the duration of time specified by the schedule provided by the user.

While initiation of the configuration is automated, some manual control is retained by users during the event. In some examples, the user can add or remove one or more sites to the configuration. For example, if heavier than expected traffic is experienced at a cell site adjacent to the location specified by the user initially, the adjacent cell site may be configured to a first responder configuration to manage traffic at the adjacent cell site. Further, particular parameters may be adjusted by the user during the duration of the event.

Following the event, or at the end time or termination time specified by the schedule, the parameters of the first provider configuration are reverted back to original values for a standard configuration of the components of the network. In one example, information defining the state of the network, or the state of particular components is retrieved to return the network components to their original or standard configuration. This is accomplished automatically, by the system, according to the schedule, and without operator intervention. In some examples, the reversion may be completed on an ASAP basis as specified by the user.

Figure 2D:
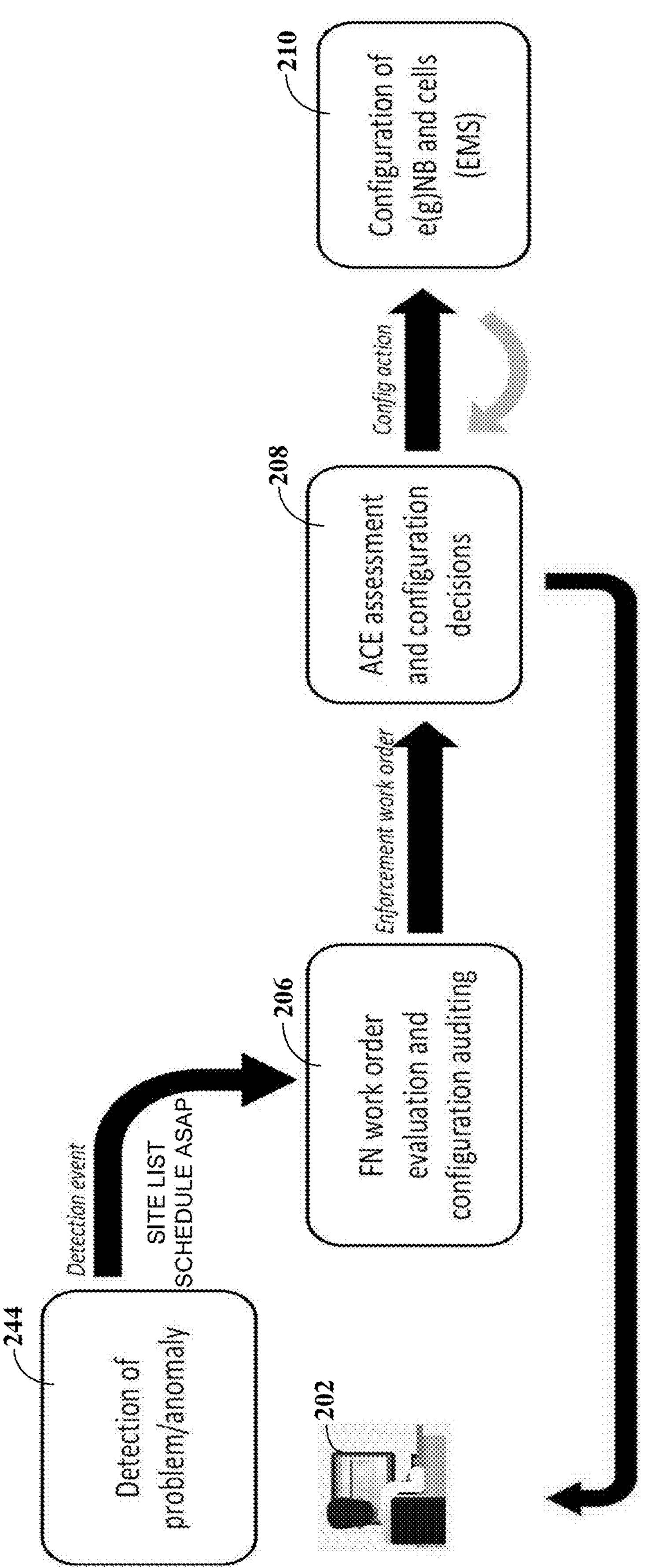
FIG. 2D is a block diagram illustrating an example, non-limiting embodiment of a method functioning within the communication network of FIG. 1 in accordance with various aspects described herein.

In the second embodiment, the configuration of the components of the first responder network may be done automatically for an unplanned event detected by automatic processes. FIG. 2D is a block diagram illustrating an example, non-limiting embodiment of a method 242 functioning within the communications network 125 of FIG. 1 in accordance with various aspects described herein. The method 242 may be similar to method 200 of FIG. 2A and share many common characteristics.

In the method 242, at step 244, a system automatically detects a problem or an anomaly in operation that requires a configuration to a first responder configuration. The operations of method 242, including step 244 may be performed at any suitable device such as the first responder network controller 204 (FIG. 2A). Step 244 may be performed in any suitable manner including monitoring any available information about network performance. The information may relate to particular sites or groups of sites, or particular subnetworks of the communication network.

Step 244 may include monitoring of any suitable traffic criteria in the network including the first responder network 123. For example, any key performance indicators of the network or of network devices may be monitored to identify an anomaly. Different traffic-related metrics may be monitored and compared with a known signature of a high-capacity event when the first responder network should be reconfigured with first responder network parameters. Different sites may react differently to a high-capacity condition, so the automatic detection process of step 244 may operate differently to detect anomalies in different parts of the network. Moreover, different combinations of factors may provide evidence of an anomaly, so the automatic detection process may try different combinations of tests, such as testing different key performance indicators from different sites against different threshold values for each site.

In one example, an automation process operating on a device such as the first responder network controller 204 monitors conditions in the communication network and compares current conditions with one or more threshold values. For example, the process may monitor the number of UE devices attached to particular eNodeB devices or sites. When the number of attached devices exceeds a threshold, the process may determine that an anomaly is occurring. Similarly, the process may monitor data throughput at particular locations or sites in the network. When throughput exceeds a threshold, the process may conclude an anomaly is occurring and that a high traffic or high-capacity situation is occurring. Similarly, in some cases information about multiple adjacent or nearby sites may be compared or aggregated to draw conclusions about anomalous conditions. Further, information about traffic trends over time may be aggregated and processed to draw conclusions. Still further, information about current traffic values or trends may be compared with historical information to draw such conclusions.

In general, the automated process may operate to identify high-capacity situations in which sites that are dedicated to the first provider network are exceeding a predetermined capacity. The threshold defining excess capacity may be any suitable value for any KPI or traffic criteria and may be specified differently over time (such as different days of the week) and for different sites. The excess capacity may be due to commercial users sharing the dedicated first responder sites. The high capacity may indicate occurrence of an unplanned event in the vicinity of one or more sites. In response to the unplanned event, the commercial users may be moved to other available sites and have limited or minimal access to the first provider sites during the unplanned event. In this manner, first provider users are given priority on the first provider network. Other types of users may be given a higher priority or a lower priority based on any suitable factors.

In response to detection of the anomaly or high-capacity condition, the automated process may determine the location of the unplanned event. For example, the process may collect traffic information for sites in the vicinity of a site reporting excessive traffic levels, to determine the geographical scope of the anomaly. If a site is not reporting current data, suggesting the site is not functional, the scope of the anomaly may be extended beyond the non-reporting site. Any suitable information may be used to determine the location and geographical scope of the unplanned event.

In response to the automatic detection of the unplanned event, the automatic process initiates a reconfiguration of the designated sites to a first provider configuration at step 206. For example, the automated process may select and apply one or more templates to determine suitable first provider configuration parameters for the sites involved. The templates may be preexisting based on past experience with such events. The templates or other configuration information may be retrieved from storage such as a database. One or more templates may be modified based on current information about the unplanned event. A work order specifying sites to be configured, parameters affected, and parameter values to be specified, is generated.

At step 208, the work order and other information are automatically assessed and final configuration details are specified. Information about the current state of the network and its components, including current parameter values, may be stored in any suitable location. Notifications may be provided to the user at control device 202 to inform the user of current status. Such notifications may include for example a change configuration report with a list of changes implemented in the first provider network. Such notifications for an unplanned event include information about the event detected and the sites affected. Such notifications and other information allow the user to actively monitor the status of components in the first provider network during the unplanned event. At step 210, the components of the first provider network are configured according to the plan. In the example, the changes are implemented as soon as possible, or immediately, to respond to the unplanned event.

During the event, network information such as traffic levels is monitored to determine current status. For example, traffic levels may be monitored to detect high-capacity conditions in which traffic levels are approaching or exceeding a threshold value. Any suitable traffic level information may be monitored, such as throughput, UE device attachments, handover volume, and other information.

The method 242 may respond dynamically to changes in the network during the unplanned event. Based on monitored information during the unplanned event, the automated process may add or remove additional sites to the first responder configuration. In some embodiments, the user may manually add or remove sites from the first responder configuration. For example, if the unplanned event is a fire that is spreading due to wind and other factors, the geographic scope of the first responder configuration should follow the spread of the fire. More sites will be configured to the first responder configuration to match the geographic scope. Further, some sites may become nonfunctional due to the unplanned event, and traffic from the nonfunctional sites must be automatically offloaded to adjacent sites. The adjacent sites will be configured according to the first responder configuration.

Following the event, the configuration parameters for the network components may be returned to their normal values. For example, the network state stored prior to the change in the configuration may be retrieved and applied to return the network components to a normal configuration.

Figure 2E:
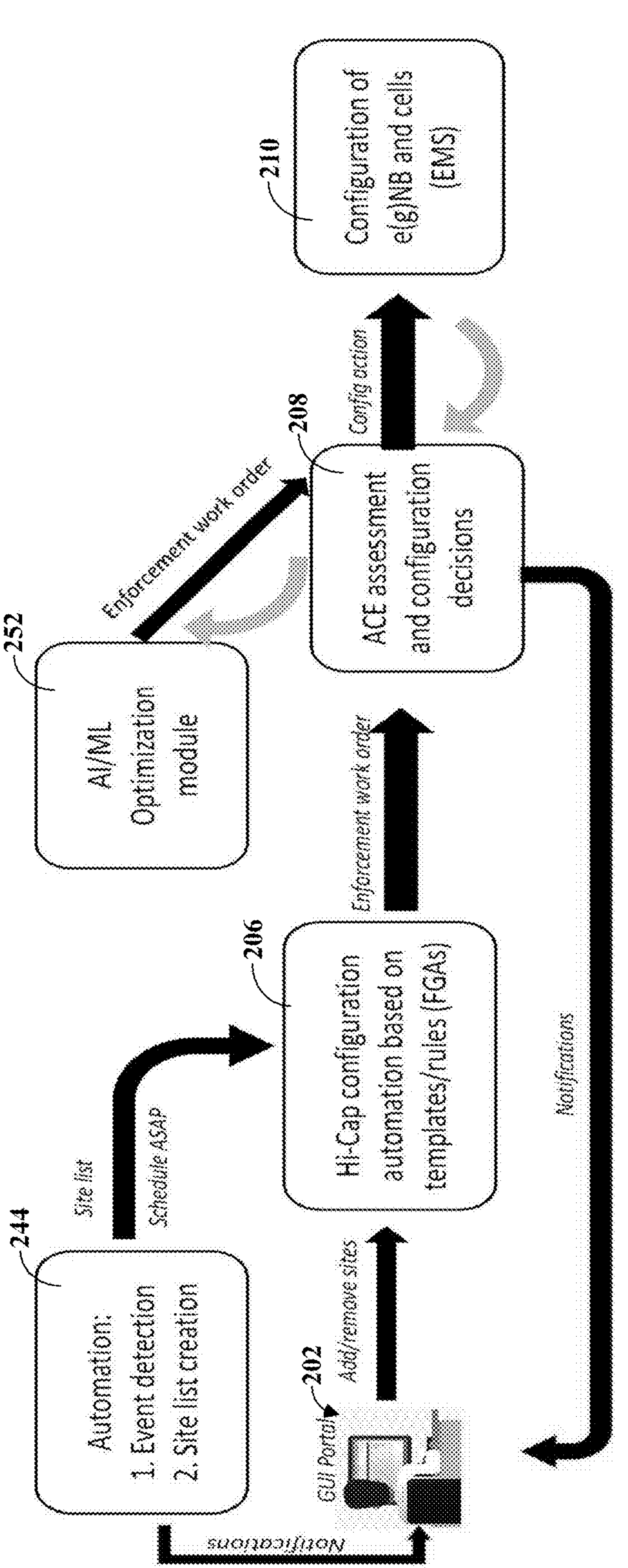
FIG. 2E is a block diagram illustrating an example, non-limiting embodiment of a method functioning within the communication network of FIG. 1 in accordance with various aspects described herein.

In the third embodiment, the configuration of the components of the first responder network may be done automatically for an unplanned event detected by automatic processes, similar to method 242 of FIG. 2D. In addition, an artificial intelligence/machine learning (AI/ML) process may be used to monitor and tune first responder parameters during an event. FIG. 2E is a block diagram illustrating an example, non-limiting embodiment of a method 252 functioning within the communications network 125 of FIG. 1 in accordance with various aspects described herein. The method 252 may be similar to method 200 of FIG. 2A and method 242 of FIG. 2D and may share many characteristics.

Similar to method 242, at step 244, an automated process detects an unplanned event and creates a site list of affected sites including components of the first provider network 123. Any suitable event detection process may be used, as discussed in conjunction with FIG. 2D above. Similarly, the list of affected sites may be created based on any suitable, available information. Step 244 in the example prepares a site list and schedule for the configuration. Generally, the schedule for the unplanned event is ASAP but other timing may be specified.

At step 206, the automated process prepares a first responder configuration based on the information from step 244 including information about affected sites and based on templates or rules for configuring sites in the network. The first responder configuration includes information about sites to be configured, parameters to be configured, and parameter values to be specified. A work order is generated. At step 208, the work order is assessed and may be modified. Notifications are provided to the user at control device 202. Information about the current configuration, including parameters and parameter values, may be stored as a network state. At step 210, the first provider configuration is provided to the network to configure components of the first provider network. The first provider configuration remains in place until the end of the event is automatically detected or until the user terminate the configuration. At termination, the sites are reconfigured back to a normal configuration.

At step 252, during the duration of an event, the AI/ML process monitors network information and may tailor or fine tune parameters or other aspects of the first provider configuration accordingly. In some embodiments, the AI/ML process may determine the initial parameter values, as in step 206. The AI/ML process may have access to any useful information including, for example, key performance indicators as well as current information in the network about traffic levels, loading and other information, trend information about recent trends in traffic in the network, and historical information about network traffic and processes. In this manner, the automation process implements automatic dynamic tuning or adjustment of parameter values.

Any suitable artificial intelligence process or machine learning model may be used at step 252 to monitor network performance and select parameters for the first operator configuration. A machine learning model may be trained using any suitable data, such as historical data collected during response to past events in the network.

The process of method 250 may be fully automated to manage networks including the first responder network. In some embodiments the user at the control device 202 remains involved. For example, the user may have supervisory authority and be provided with various notifications about network operation and performance. The user may further continue to schedule known events, consistent with method 200 of FIG. 2A.

Following the event, the configuration parameters for the network components may be returned to their normal values. For example, the network state stored prior to the change in the configuration may be retrieved and applied to return the network components to a normal configuration.

In some embodiments of the method 200, the method 242 and the method 252, an automatic misconfiguration detection process may monitor network performance. It may occur that one or more components of the first provider network is given an improper configuration, with either improper parameters or improper parameter values for the current situation during either a planned or unplanned event. This may be referred to as a misconfiguration. The misconfiguration detection process monitors network performance before a configuration is applied and after a configuration such as the first provider configuration is applied. The misconfiguration detection process monitors the network for a suitable amount of time, such as 15 minutes or one hour. The change in network performance may be detected and if a degradation is identified, the process may conclude that a misconfiguration was applied and implement a rollback of the configuration. Any suitable parameters or KPIs may be monitored to identify a degradation in network performance.

In some embodiments, the AI/ML process may be used to implement a misconfiguration detection process. The misconfiguration may apply to the entire first provider configuration, which may need to be rolled back. Alternatively, the misconfiguration may apply only to a portion of the first responder configuration, such as some parameters at some sites of the first responder network.

While for purposes of simplicity of explanation, the respective processes are shown and described as a series of blocks in FIG. 2A, FIG. 2D and FIG. 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
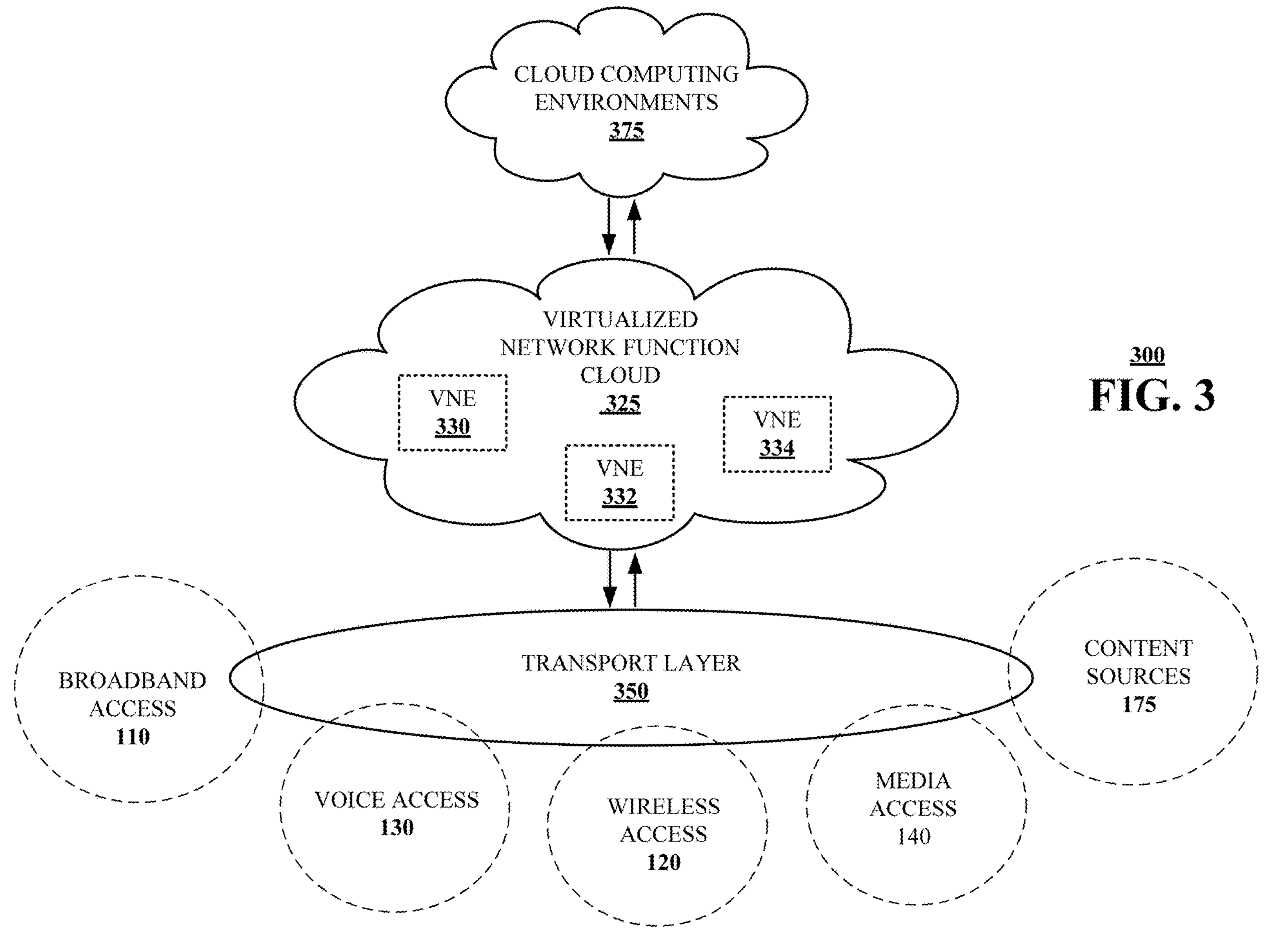
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of method 200, method 242 and method 252 presented in FIG. 1, FIG. 2A, FIG. 2B, FIG. 2C, FIG. 2D, FIGS. 2E, and 3. For example, virtualized communication network 300 can facilitate in whole or in part identifying a high-capacity event in a network and automatically updating parameters of dedicated first responder components of the network to limit access to the first responder components by non-first responder users.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
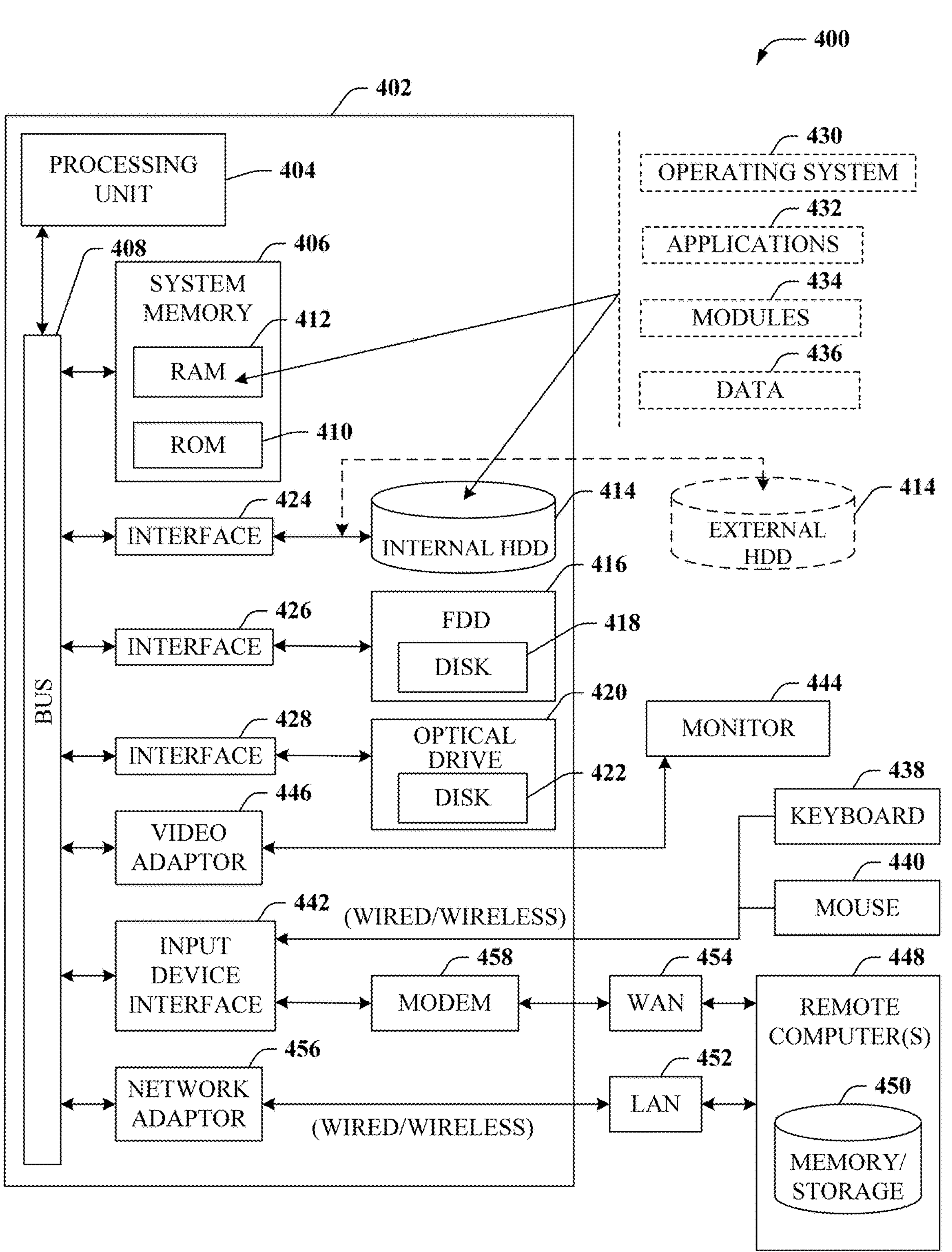
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part identifying a high-capacity event in a network and automatically updating parameters of dedicated first responder components of the network to limit access to the first responder components by non-first responder users.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
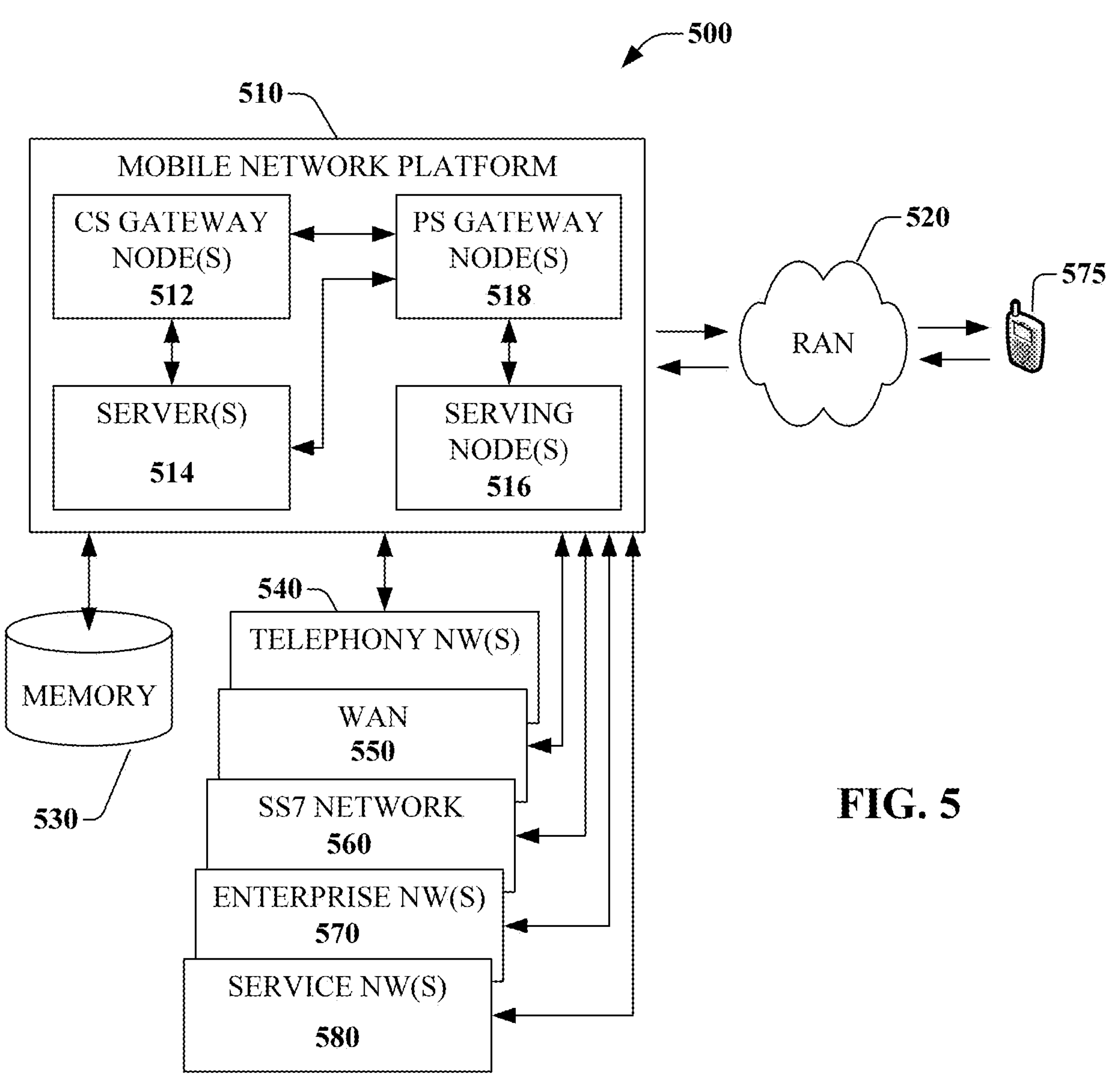
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part identifying a high-capacity event in a network and automatically updating parameters of dedicated first responder components of the network to limit access to the first responder components by non-first responder users. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
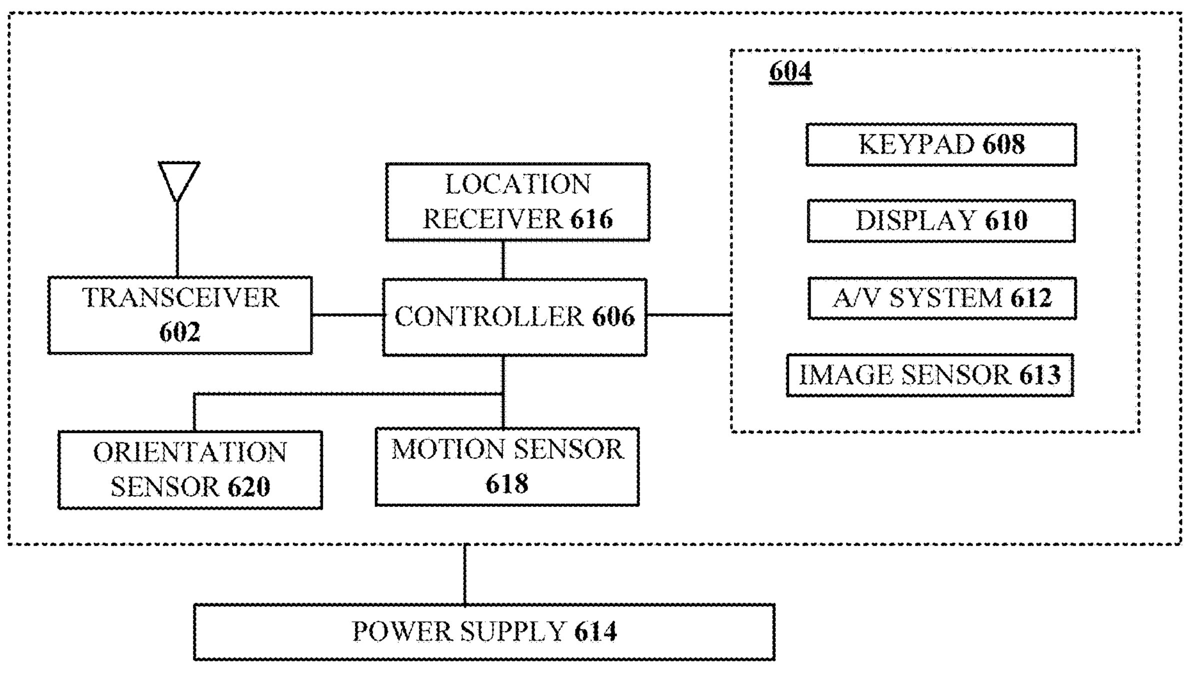
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part identifying a high-capacity event in a network and automatically updating parameters of dedicated first responder components of the network to limit access to the first responder components by non-first responder users.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, f(x) =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A device, comprising:

a processing system including a processor; and a memory that stores executable instructions that, when executed by the processing system, facilitate performance of operations, the operations comprising:

receiving information defining a high-capacity event in a mobility network, the mobility network including network elements selectively configurable to a first responder configuration for providing communication services to first responder users;

receiving information defining a network location of the high-capacity event in the mobility network;

configuring a set of first responder elements of the network elements to the first responder configuration, wherein the set of first responder elements are automatically selected based on the information defining the network location of the high-capacity event, wherein the configuring the set of first responder elements prioritizes access to the set of first responder elements by first responder users;

enabling access to the set of first responder elements by the first responder users based on the configuring the set of first responder elements;

limiting access to the set of first responder elements by non-first responder users based on the configuring the set of first responder elements;

determining an end time for the high-capacity event; and after the end time for the high-capacity event, automatically configuring the set of first responder elements of the network elements to a normal configuration, wherein the normal configuration permits access to the set of first responder elements by non-first responder users.

2. The device of claim 1, wherein the receiving information defining the high-capacity event comprises:

receiving user input defining the network location of the high-capacity event.

3. The device of claim 2, wherein the operations further comprise:

receiving user input defining the network location of the high-capacity event;

receiving user input defining a time of the high-capacity event; and automatically configuring the set of first responder elements at the time of the high-capacity event.

4. The device of claim 2, wherein the operations further comprise:

receiving user input defining the network location of the high-capacity event;

receiving user input defining a schedule of future times of occurrences the high-capacity event; and automatically configuring the set of first responder elements at the future times of occurrences of the high-capacity event, according to the schedule of future times of occurrences the high-capacity event.

5. The device of claim 1, wherein the receiving information defining the high-capacity event comprises:

automatically detecting an anomaly in operation of the mobility network that requires a configuration to the first responder configuration;

selecting a set of first responder parameters based on the automatically detecting the anomaly in operation of the mobility network; and providing the set of first responder parameters to the set of first responder elements to configure the set of first responder elements responsive to the automatically detecting the anomaly in operation of the mobility network.

6. The device of claim 5, wherein the receiving information defining the network location of the high-capacity event comprises:

identifying a location of the anomaly in operation of the mobility network;

identifying the set of first responder elements based on the location of the anomaly in operation of the mobility network; and automatically providing the set of first provider parameters to the set of first responder elements substantially immediately to enable first provider operation of the mobility network.

7. The device of claim 1, wherein the limiting comprises preventing attachment of non-first-responder user devices to the network elements when a traffic level at the network elements exceeds a threshold.

8. The device of claim 1, wherein the operations further comprise:

prior to the configuring a set of first responder elements of the network elements to the first responder configuration, storing information defining a network state, the information defining the network state including parameters associated with the normal configuration; and after the end time for the high-capacity event, retrieving the information defining the network state; and automatically configuring the set of first responder elements according to the parameters associated with the normal configuration.

9. The device of claim 1, wherein the operations further comprise:

selecting a set of first responder parameters to configure the set of first responder elements according to the first responder configuration;

monitoring, by an artificial intelligence process, key performance indicators of the mobility network during operation according to the first responder configuration; and adjusting one or more of the first responder parameters responsive to the monitoring key performance indicators to improve operation of the mobility network.

10. The device of claim 9, wherein the operations further comprise:

automatically detecting, by the artificial intelligence process, an anomaly in operation of the mobility network that requires a configuration to the first responder configuration;

selecting a set of first user parameters based on the automatically detecting the anomaly in operation of the mobility network; and providing the set of first responder parameters to the set of first responder elements.

11. A non-transitory machine-readable medium, comprising executable instructions that, when executed by a processing system including a processor, facilitate performance of operations, the operations comprising:

receiving information defining a high-capacity event in a mobility network, the mobility network including network elements selectively configurable to a first responder configuration for providing communication services to first responder users during high-capacity events;

receiving information defining a network location of the high-capacity event in the mobility network;

receiving information defining a set of first responder elements of the network elements, the set of first responder elements including network elements requiring configuration to a first responder configuration to respond to the high-capacity event;

configuring a set of first responder elements of the network elements to the first responder configuration, wherein the configuring the set of first responder elements comprises providing to the set of first responder elements first responder parameters which relate to admission control and load balancing in the set of first responder elements and confirming that the set of first responder elements of the network elements has been configured to the first responder configuration;

determining an end time for the high-capacity event; and after the end time for the high-capacity event, automatically configuring the set of first responder elements of the network elements to a normal configuration, wherein the normal configuration permits access to the set of first responder elements by non-first responder users.

12. The non-transitory machine-readable medium of claim 11, wherein the operations further comprise:

receiving, at a menu system accessed by a user, user input defining a location of the high-capacity event;

receiving, at the menu system, additional user input defining timing information of the high-capacity event; and automatically configuring a set of first responder elements according to the user input defining the location and the additional user input defining timing information.

13. The non-transitory machine-readable medium of claim 12, wherein the receiving additional user input defining timing information of the high-capacity event comprises:

receiving user input defining a schedule of future times of planned high-capacity events; and automatically configuring the set of first responder elements at the future times of the planned high-capacity events, according to the schedule of future times of planned high-capacity events.

14. The non-transitory machine-readable medium of claim 11, wherein the operations further comprise:

automatically detecting an anomaly in operation of the mobility network;

determining that the anomaly requires a configuration to the first responder configuration;

identifying a location of the anomaly in operation of the mobility network;

identifying the set of first responder elements based on the location of the anomaly in operation of the mobility network;

selecting first responder parameters based on the automatically detecting the anomaly in operation of the mobility network; and providing the first responder parameters to the set of first responder elements to configure the first responder elements to the first responder configuration.

15. The non-transitory machine-readable medium of claim 14, wherein the operations further comprise:

operating the first responder elements according to the first responder configuration;

monitoring, by an artificial intelligence process, key performance indicators of the mobility network during the operating according to the first responder configuration; and adjusting one or more of the first responder parameters responsive to the monitoring key performance indicators to improve operation of the mobility network.

16. A method, comprising:

receiving, by a processing system including a processor, information defining a high-capacity event in a mobility network;

receiving, by the processing system, information defining a network location of the high-capacity event in the mobility network;

automatically configuring, by the processing system, one or more network components of the mobility network according to a set of high-capacity parameters, the one or more network components associated with the network location of the high-capacity event;

limiting, by the processing system, access to the mobile network to specific users according to the high-capacity parameters;

determining an end time for the high-capacity event; and after the end time for the high-capacity event, automatically configuring, by the processing system, the one or more network components of the mobile network according to a set of reversion parameters to restore a normal configuration, wherein the normal configuration permits access to the one or more network components by users other than the specific users.

17. The method of claim 16, wherein the limiting access to the mobile network to specific users comprises:

limiting, by the processing system, access to selected network elements of the mobile network to first responder users.

18. The method of claim 17, wherein the automatically configuring one or more network components of the mobility network comprises:

configuring, by the processing system, the selected network elements with first responder parameters to limit access to the selected network elements to the first responder users.

19. The method of claim 17, comprising:

receiving, by the processing system, information defining a time of the high-capacity event;

at the time of the high-capacity event, moving, by the processing system, respective network users other than the first responder users from communication with a first responder cell site of the selected network elements to a non-first responder cell site of the mobility network; and preventing, by the processing system, attachment of network users other than the first responder users to the first responder cell site of the selected network elements.

20. The method of claim 16, wherein the receiving information defining a high-capacity event in the mobility network comprises:

automatically detecting, by the processing system, an anomaly in operation that requires a configuration to a first responder configuration; and automatically configuring, by the processing system, immediately the one or more network components of the mobility network according to the set of high-capacity parameters to enable the first responder configuration.

* * * * *